No. 672,883. Patented Apr. 30, 1901.
O. S. BAGNE.
MEASURING VESSEL.
(Application filed July 31, 1900.)
(No Model.) 2 Sheets—Sheet 1.
Fig. I.
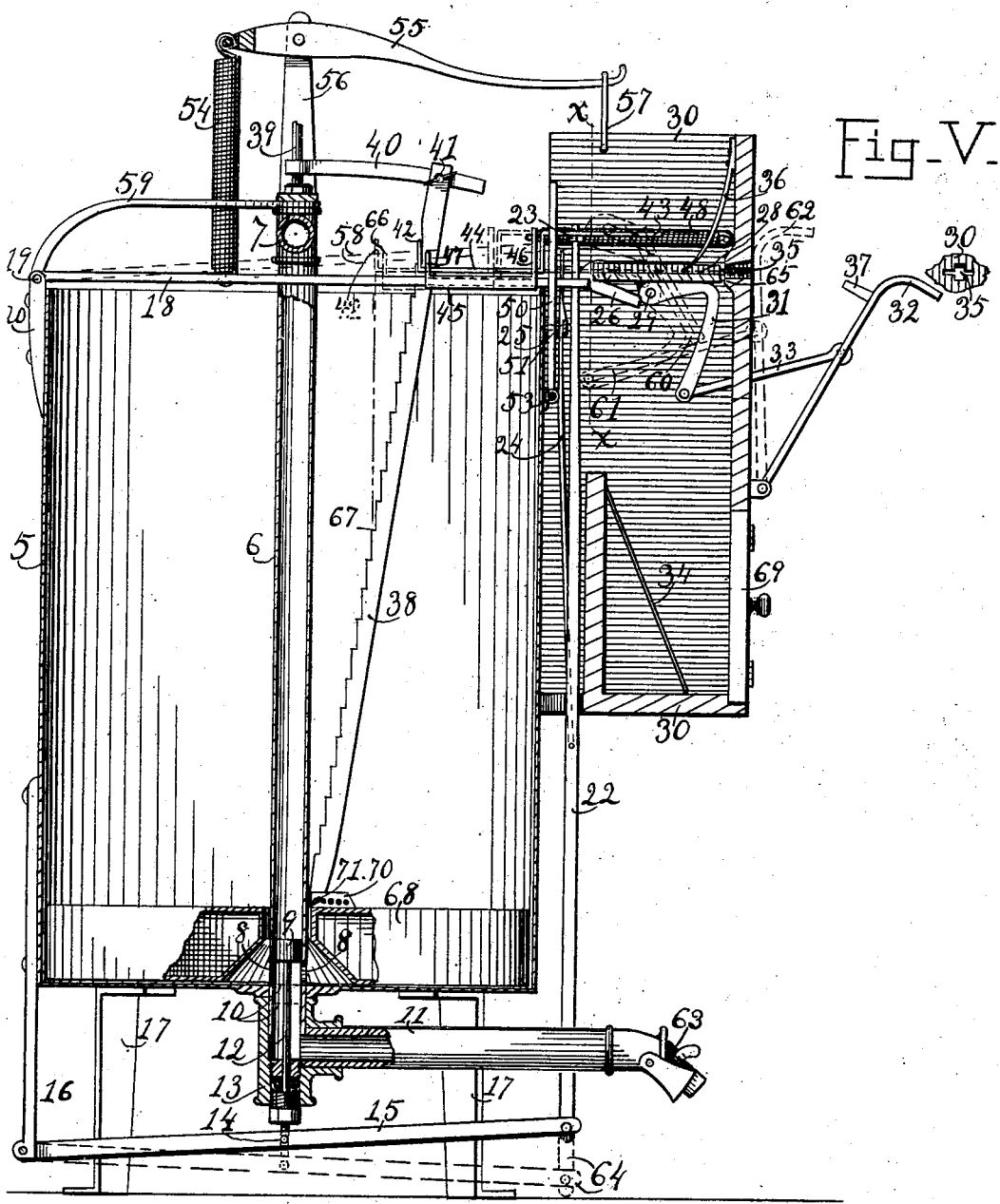
WITNESSES,
N. Stevens.
P. E. Stevens.
INVENTOR.
Ole S. Bagne.
by W. K. Stevens ATTY.

No. 672,883. Patented Apr. 30, 1901.
O. S. BAGNE.
MEASURING VESSEL.
(Application filed July 31, 1900.)
(No Model.) 2 Sheets—Sheet 2.
Fig. II.
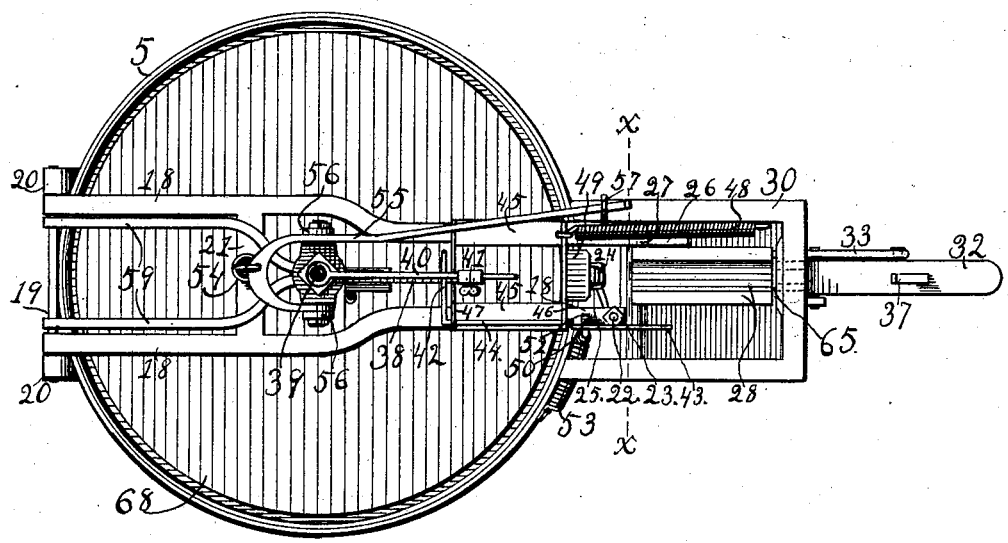
Fig. III.
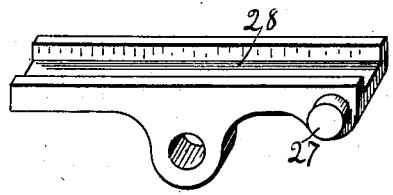
Fig. IV.
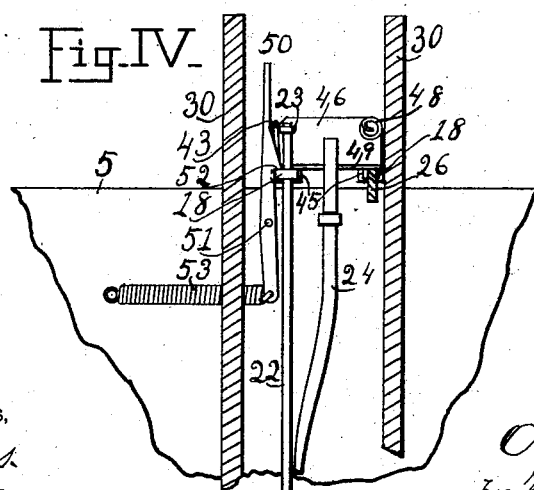
WITNESSES,
N. Stevens
P. E. Stevens.
INVENTOR.
Ole S. Bagne
by W. X. Stevens ATTY.
THE NORRIS PETERS CO., PHOTO-LITHO., WASHINGTON, D. C.

UNITED STATES PATENT OFFICE.

OLE S. BAGNE, OF PALMER, MINNESOTA.

MEASURING VESSEL.

SPECIFICATION forming part of Letters Patent No. 672,883, dated April 30, 1901.

Application filed July 31, 1900. Serial No. 25,387. (No model.)

*To all whom it may concern:*

Be it known that I, OLE S. BAGNE, a citizen of the United States, residing at Palmer, in the county of Waseca and State of Minnesota, have invented a new and useful Improvement in Measuring Vessels; and I do hereby declare the following to be a full, clear, and exact description of the same.

This invention relates to that class of measuring vessels which are provided with mechanical means for determining the amount which the vessel shall measure out at each operation; and its particular adaptation is for measuring skim-milk according to a predetermined percentage. The milk which is brought to a creamery by various producers will yield at different times different percentages of cream, say from twenty to twenty-five per cent., leaving a balance of from seventy-five to eighty per cent. of skim-milk to be returned to the producers; and the object of the present invention is to measure out quickly and accurately to each producer an amount of skim-milk proportional to the quantity of whole milk which he delivered to the creamery, the average percentage of the skim-milk to the whole milk being taken into the account.

To this end my invention consists in the construction and combination of parts forming a measuring vessel hereinafter more fully described, and particularly pointed out in the claims, reference being had to the accompanying drawings, in which—

Figure I is a longitudinal vertical section, partly in side elevation, of a measuring vessel according to my invention. Fig. II is a top view of the same. Fig. III is a perspective view of the ticket-guide. Fig. IV represents a portion of the setting and tripping device as seen from the right at the sectional plane *x x*, Fig. I. Fig. V is a fragmental face view of the ticket-box in the region of the slot.

Numeral 5 represents a can, which is the measuring vessel proper of this invention.

6 is a pipe having an inlet connection at 7 coming from the skim-milk reservoir. (Not shown.) The pipe 6, passing vertically and centrally through the can 5, has communication therewith through holes 8 and is provided with a vertically-reciprocating piston-valve 9. When the valve is located above the holes 8, as shown in the drawings, the holes are open to permit the escape of the milk through pipe 6 and the discharge-pipe 11, and when located below the holes, as shown at dotted lines 10, the valve leaves the holes 8 open to receive milk into the can from the inlet-pipes 7 and 6. The valve-stem 12 passes through a packing-box 13 and is connected at 14 with an intermediate lever 15, which is pivoted to a bracket 16, that is made fast to the can 5.

17 represents the legs on which the can 5 stands.

18 is the main lever, pivoted at 19 to a bracket 20, that is secured to the can 5. The lever 18 comprises two arms, as shown in Fig. II, joined by cross-bars, one of which is shown at 21. Through one arm of the main lever a rod 22 passes freely to the intermediate lever 15, and 23 is a stop-nut on the rod 22.

24 is a latch hung to the side of the rod 22 to engage a catch 25, that is fixed to the can to hold the lever 15 raised, as shown. The other arm of the main lever is provided with a forked or slotted end 26, the slot of which is engaged by a trunnion 27, that projects from the side of the ticket-guide 28. This guide is mounted to rock upon a pivot 29, that is fixed to the ticket-box 30. 31 is an elbow-lever independently mounted on the same pivot 29 and connected with the hand-lever 32 by a rod 33.

34 represents a ticket that has fallen to the bottom of the ticket-box after having done service.

35 represents a slot in the side of the box through which the tickets are inserted for service.

36 is a guard-spring for keeping the ticket down in the guide 28 while being inserted. These tickets are made of different lengths of some stiff material, such as strap-iron.

37 is a finger projecting from the hand-lever 32 to enter the slot 35 behind a ticket to push the ticket into place. The finger 37 is much thicker than a ticket, so that it will be sure to engage the end thereof, and the slot 35 is vertically enlarged midway, as shown in the adjacent detail face view, to admit the said finger.

68 is a float located around the pipe 6, within the can 5, to be raised by the milk that comes in to be measured.

38 is a toothed gage-bar mounted in a slanting position upon the float 68 to rise and fall therewith. This gage-bar may be bent to extend directly to the fixed rod 39 and be fitted to slide up and down thereon freely as a guide to steady the upper end of the gage-bar, or it may be provided with an arm 40, on which it is radially adjustable, and a binding-screw 41 to secure the gage-bar at any point upon the arm, as shown.

42 is a trip-arm, and 43 a crank-arm on a rock-shaft 44, which is journaled in the end dashers 46 and 47 of a carriage 45, that is mounted to slide on the two arms of the main lever 18, and 48 is a spring acting between the box 30 and the dasher 46 of the carriage to pull the carriage to the right. The motion of the carriage to the right is ended when a scraper-like projection 49 thereof has pushed the latch 24 to engage its catch 25, as shown.

50 is a latch pivoted to the can at 51 to engage one arm of the lever 18 at 52, and it is provided with a spring 53, that tends to that engagement.

54 is a spring connecting the cross-bar 27 of the lever 18 with the lever 55, that is pivoted to a bracket 56, that is fixed to the pipe 6. The spring 54 is hung to lift the lever 18 to the position shown by dotted lines 58. The lever 55 is held in position to strain the spring 54 when in service by means of a link 57, that is secured to the ticket-box 30; but when out of service the tension may be let off from the spring by swinging the link 57 free from the lever 55. The length of this lever enables the operator to readily strain the spring to the tension required for service.

59 is a bracket secured to the can for holding the pipe 6 and guiding-rod 39 centrally in the can. In the normal unset condition the levers 18 are raised to the position of the dotted lines 58, the ticket-guide 28 is in the position of dotted lines 60, and the elbow-lever 31 and hand-lever 32 are respectively at the dotted lines 61 and 62.

63 is a faucet by which the contents of the can may be discharged at the proper time.

To operate this measuring vessel, the operator first takes hold of lever 32 and pulls it from the position of dotted lines 62 to the position shown in full lines. This, acting through the connecting-rod 33 and elbow-lever 31, rocks the ticket-guide into its present horizontal position, and that, acting on the slotted end 27 of the lever 18, brings the latter down into position to be caught and retained by the catch 52 of latch 50. Everything is now in readiness to open the valve and admit milk. Now the producer presents a ticket that indicates the amount of skim-milk due him, and the operator places the ticket in the slot 35 and pushes it in by the aid of the hand-lever 32 and its finger 37. The latch 24, which stands when set in the path of the ticket, is pushed free from its catch 25 by the entering ticket. This permits the rod 22 and intermediate lever 15 to fall to the position shown in dotted lines 64, carrying with them the valve 9 to the position of the dotted lines 10, which opens the holes 8 to admit milk from pipe 6; but the entering ticket meets the dasher 46 of the carriage 45 and pushes the carriage a distance corresponding to the length of the ticket, and when pushed in by finger 37 the ticket will drop down a little and rest against the face 65 of the box below the slot 35 and hold the carriage 45 against the action of its retracting-spring 48. Let it be supposed that the ticket is long enough to push the carriage to the position of dotted lines 66. In so doing it will carry the trip-arm 42 to the position to be engaged by the tooth 67 of the gage-bar 38, and when the float 68 is raised by the entering milk so high as to lift the radial arm 42 by said tooth 67 the crank-arm 43 of the rock-shaft 44 will trip the latch 50. This instantly releases the lever 18 to be raised by spring 54 to the position of dotted lines 58, carrying with it the rod 22, by means of the nut 23 thereon, and shifting the valve 9 to the position shown in full lines, thus closing the inlet and opening the outlet to the can. The amount of milk corresponding to the ticket being now in the can, it may be drawn off at the faucet 63 for the producer. The raising of lever 18 tips the ticket-guide 28 and drops the ticket into the bottom of the ticket-box, as shown at 34. 69 is a door in the box at which the tickets may be removed. The gage-bar 38 may be provided with any means for adjustment along the path of the coacting trip-arm 42, such as the slide-rod 40 and binding-screw 41, shown at the top, or as the multiperforated block 70 at the bottom and the pin 71 to engage the bar with any one of the perforations. Thus the percentage of delivery of milk relatively to the length of the tickets may be changed to suit the percentage of skim-milk to be delivered on each ticket, or different sets of tickets may be furnished for the different percentages, gaged relatively to a permanently-fixed gage-bar 38. For example, let us suppose that a producer brings in one hundred pounds of milk rated at twenty-five per cent. cream. Then he should receive back seventy-five pounds of skim-milk. Now the ticket which he receives may be marked either "100," corresponding to the full amount brought in, or it may be marked "75," corresponding to the number of pounds he should receive back; but in both cases the ticket would be of such length as would cause the delivery of seventy-five pounds of skim-milk; or if the whole milk brought in were rated at only twenty per cent. cream there would be eighty pounds of skim-milk left for the producer, and either a ticket marked "80" or one marked "100," but corresponding to eighty per cent., would be given him. Again, the tickets may remain at one length for each weight, and the gage-bar 38 may be adjusted to correspond with the percentage of the skim-milk to be delivered.

It will thus be seen that this measuring vessel may be adapted for measuring fluids so as to deliver any required percentage of a given amount. Therefore, while the problem as above set forth would require some mathematical knowledge for fulfilment with common measuring and weighing vessels, the problem is rendered a matter of simple mechanical detail by this measuring vessel, so that when properly adjusted, this vessel may be used rapidly and accurately by an uneducated operator.

Having thus fully described my invention, what I believe to be new, and desire to secure by Letters Patent, is the following:

1. In measuring vessels, a can; a pipe passing vertically through the can and having valve-openings into the can near its bottom; a piston-valve fitted to slide in the pipe past the said openings; a float in the can, a notched gage-bar carried in a slanting position by the float, a main lever pivoted to the can and crossing transversely to the gage-bar; a spring for raising the said lever, and a latch for holding the lever set down; a carriage fitted to slide on said lever; a rock-shaft journaled in the said carriage and having an arm to engage the said gage-bar, and a crank to engage the said latch; a ticket-box fixed to the can and a ticket-slot through the side of the box in line of the aforesaid carriage; an intermediate lever hung to the aforesaid valve; a rod freely connecting the intermediate lever with the aforesaid main lever; a latch for the rod, located in the path of an entering ticket; a spring for the aforesaid carriage resisting the advance thereof, and means for pushing the ticket against said carriage until the ticket rests its rear end against the inner face of the box, substantially as described.

2. A measuring-can; an inlet and outlet and a valve therefor; a latch to hold the valve with the inlet open; a float in the can; a slanting notched gage-bar upon the float; a trip-arm crossing the path of the gage-bar and located to engage the said latch, and adapted to be pushed by an entering ticket to be engaged by a notch of the gage-bar, and means for shifting the valve when the said latch is released, substantially as described.

3. A measuring-can having an outlet and inlet valve; a float in the can and a slanting notched gage-bar on the float; a carriage fitted to slide transversely to the gage-bar, and a trip-arm mounted in the said carriage to be engaged by a tooth of the said gage-bar; a ticket-slot and a guideway in line of the said carriage; a hand-lever having a finger to enter the said slot and push in a ticket, and with it to push forward the said carriage; a shoulder to the finger limiting its entrance, and a latch for the said valve to be released by the said trip-arm, substantially as described.

4. In measuring vessels, an inlet-valve; means for holding the valve closed, and a latch for locking and releasing the holding means; a ticket-guide in line of the said latch and mounted to rock upon a pivot, and connection between the said means for holding the valve closed and the ticket-guide whereby the operation of the means tips the said ticket-guide substantially as described.

5. In measuring vessels, a can having an inlet and a valve therefor; a guideway for stiff tickets; means for opening the said inlet-valve; a latch located in the path of an entering ticket and holding the outlet-valve-opening mechanism from operating; and means for limiting the inflow of fluid to be measured, also located in the path of an entering ticket substantially as described, whereby a ticket in passing to its place first trips the latch and lets the valve be opened and then sets the mechanism for limiting the inflow.

6. The combination of the main lever pivoted to the can and having a slot in one arm; a ticket-box; the ticket-guide pivoted in the box and having a trunnion engaging the said slot; an elbow-lever independently mounted on the same pivot as the ticket-guide to bear against one arm thereof, an external hand-lever connected with the said elbow-lever and a catch for the main lever, substantially as described.

In testimony whereof I affix my signature in presence of two witnesses.

OLE S. BAGNE.

Witnesses:
SEGAR JACKSEN,
THOMAS K. ALLAND.